United States Patent
Kanai et al.

(10) Patent No.: US 10,474,494 B2
(45) Date of Patent: Nov. 12, 2019

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Jun Kanai, Inagi (JP); Shinya Takumi, Kawasaki (JP); Mikio Hashimoto, Bunkyo (JP); Hiroshi Isozaki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 69 days.

(21) Appl. No.: 15/438,222

(22) Filed: Feb. 21, 2017

(65) Prior Publication Data

US 2018/0081712 A1    Mar. 22, 2018

(30) Foreign Application Priority Data

Sep. 16, 2016   (JP) .................. 2016-182171

(51) Int. Cl.
*G06F 9/455*   (2018.01)
*G06F 9/48*    (2006.01)

(52) U.S. Cl.
CPC ........ *G06F 9/4812* (2013.01); *G06F 9/45533* (2013.01)

(58) Field of Classification Search
CPC ......... G06F 9/4843; G06F 2009/45587; G06F 21/53; G06F 21/6281; G06F 9/4812; G06F 21/70; G06F 9/441; G06F 9/461
See application file for complete search history.

(56) References Cited

U.S. PATENT DOCUMENTS

| | | | |
|---|---|---|---|
| 8,042,117 B2 | 10/2011 | Ohta et al. | |
| 8,595,746 B2 | 11/2013 | Shidai et al. | |
| 8,966,489 B2 | 2/2015 | Yasaki et al. | |
| 2001/0016879 A1* | 8/2001 | Sekiguchi | G06F 9/4843 719/319 |
| 2003/0154337 A1* | 8/2003 | Ohno | G06F 9/45533 710/260 |
| 2004/0153593 A1* | 8/2004 | Watt | G06F 9/466 710/200 |
| 2004/0205755 A1* | 10/2004 | Lescouet | G06F 9/4843 718/100 |
| 2005/0138249 A1* | 6/2005 | Galbraith | G06F 15/17 710/100 |

(Continued)

FOREIGN PATENT DOCUMENTS

| | | |
|---|---|---|
| EP | 1 054 322 A2 | 11/2000 |
| EP | 1 467 282 A2 | 10/2004 |

(Continued)

*Primary Examiner* — Dong U Kim
(74) *Attorney, Agent, or Firm* — Oblon, McClelland, Maier & Neustadt, L.L.P.

(57) ABSTRACT

An information processing apparatus according to an embodiment includes a reception unit and switching unit. The reception unit receives an interrupt. The switching unit that switches a second operating system (OS) which is executing in a core to a first OS to which the interrupt for the first OS is input, when the reception unit receives an interrupt for the core in which the first OS is a priority OS and the second OS is not the priority OS.

11 Claims, 15 Drawing Sheets

(56) References Cited

U.S. PATENT DOCUMENTS

| | | | |
|---|---|---|---|
| 2005/0149933 A1* | 7/2005 | Saito | G06F 9/4843 |
| | | | 718/100 |
| 2010/0325329 A1* | 12/2010 | Sakai | G06F 9/544 |
| | | | 710/269 |
| 2013/0219408 A1* | 8/2013 | Haruki | G06F 21/52 |
| | | | 718/108 |
| 2014/0122902 A1 | 5/2014 | Isozaki et al. | |
| 2014/0123320 A1 | 5/2014 | Isozaki et al. | |
| 2014/0298026 A1* | 10/2014 | Isozaki | H04L 9/0825 |
| | | | 713/171 |
| 2014/0372651 A1 | 12/2014 | Kanai et al. | |
| 2015/0052544 A1 | 2/2015 | Kanai et al. | |
| 2015/0082053 A1 | 3/2015 | Sano et al. | |
| 2015/0089213 A1 | 3/2015 | Isozaki et al. | |
| 2015/0089246 A1 | 3/2015 | Kanai et al. | |
| 2016/0055030 A1 | 2/2016 | Kanai et al. | |
| 2016/0378693 A1 | 12/2016 | Sasaki et al. | |
| 2018/0239896 A1* | 8/2018 | Kato | G06F 21/53 |

FOREIGN PATENT DOCUMENTS

| | | |
|---|---|---|
| EP | 2 492 810 A1 | 8/2012 |
| JP | 2000-284080 | 10/2000 |
| JP | 2001-216172 A | 8/2001 |
| JP | 2008-52714 | 3/2008 |
| JP | 2009-176139 | 8/2009 |
| JP | 2009-230549 | 10/2009 |
| JP | 2011-198346 | 10/2011 |
| JP | 2014-89644 | 5/2014 |
| JP | 2014-89652 | 5/2014 |
| JP | 2014-191509 | 10/2014 |
| JP | 2015-1947 | 1/2015 |
| JP | 2015-36935 | 2/2015 |
| JP | 2015-60249 | 3/2015 |
| JP | 2015-60569 | 3/2015 |
| JP | 2015-64677 | 4/2015 |
| JP | 2016-45596 | 4/2016 |
| JP | 2017-10347 | 1/2017 |
| JP | 2017-54243 A | 3/2017 |

\* cited by examiner

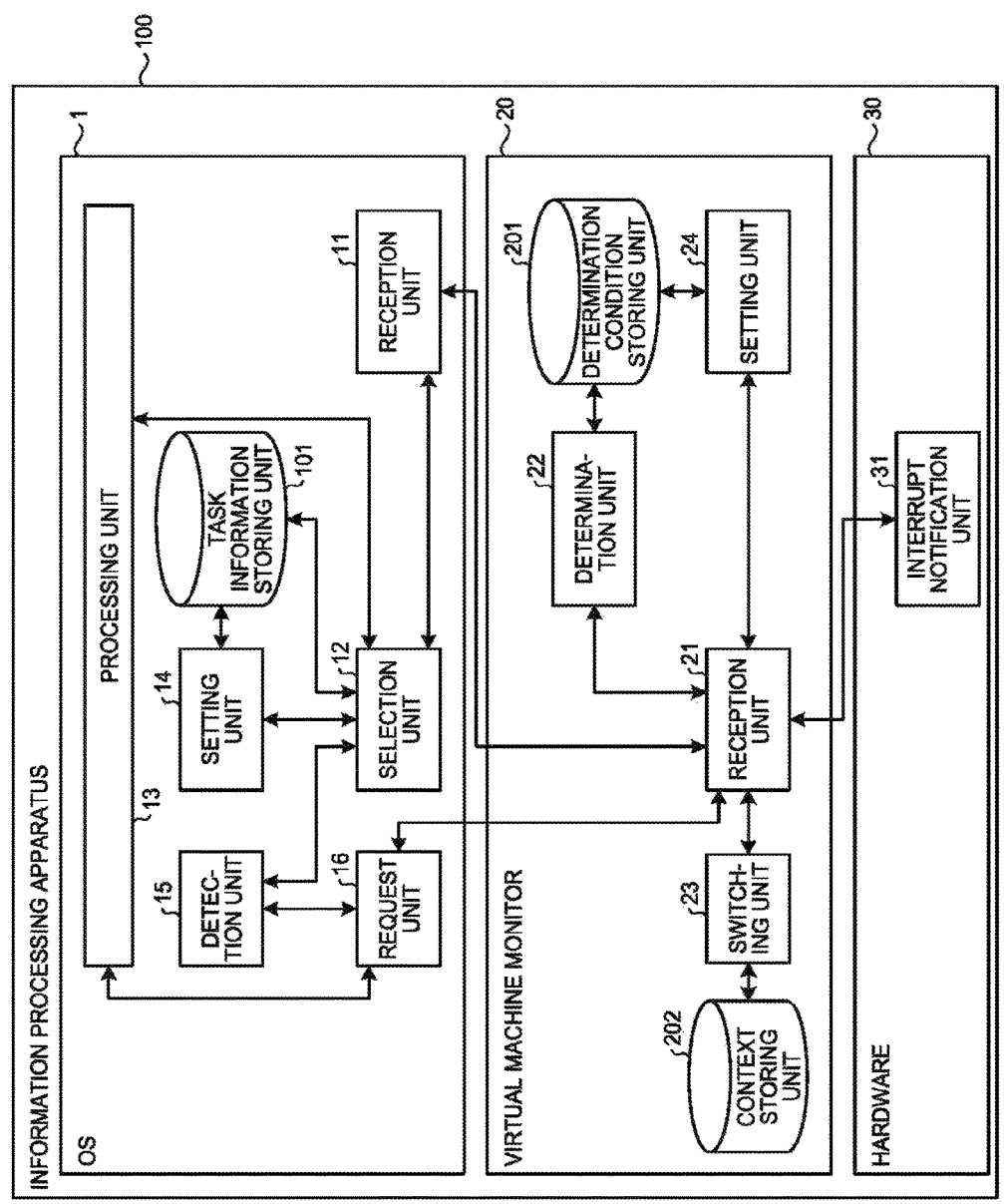

FIG.3A

| INTERRUPT | INPUT DESTINATION OS |
|---|---|
| INTERRUPT A | OS1 |
| INTERRUPT B | OS2 |

FIG.3B

| CORE | PRIORITY OS |
|---|---|
| 1 | OS2 |
| 2 | OS1 |

| TASK NAME | TYPE | ASSIGNMENT | STATE |
|---|---|---|---|
| TASK A | REAL TIME TASK | SECOND CORE | EXECUTABLE |
| TASK B | REAL TIME TASK | SECOND CORE | I/O STANDBY |
| TASK C | NON-REAL TIME TASK | FIRST CORE OR SECOND CORE | EXECUTION |

FIG.7B

| INTERRUPT GENERATING CORE | INTERRUPT | OS EXECUTED IMMEDIATELY BEFORE GENERATION OF INTERRUPT | OS OPERATING WITH PRIORITY IN CORE | INTERRUPT INPUT DESTINATION OS | OS SWITCHING | INTERRUPT INPUT |
|---|---|---|---|---|---|---|
| 1 | INTERRUPT A | OS1 | OS2 | OS1 | NONE | INPUT |
| 1 | INTERRUPT A | OS2 | OS2 | OS1 | NONE | INPUT PENDING |
| 1 | INTERRUPT B | OS1 | OS2 | OS2 | SWITCHING TO OS 2 | INPUT |
| 1 | INTERRUPT B | OS2 | OS2 | OS2 | NONE | INPUT |
| 2 | INTERRUPT A | OS1 | OS1 | OS1 | NONE | INPUT |
| 2 | INTERRUPT A | OS2 | OS1 | OS1 | SWITCHING TO OS 1 | INPUT |
| 2 | INTERRUPT B | OS1 | OS1 | OS2 | NONE | INPUT PENDING |
| 2 | INTERRUPT B | OS2 | OS1 | OS2 | NONE | INPUT |

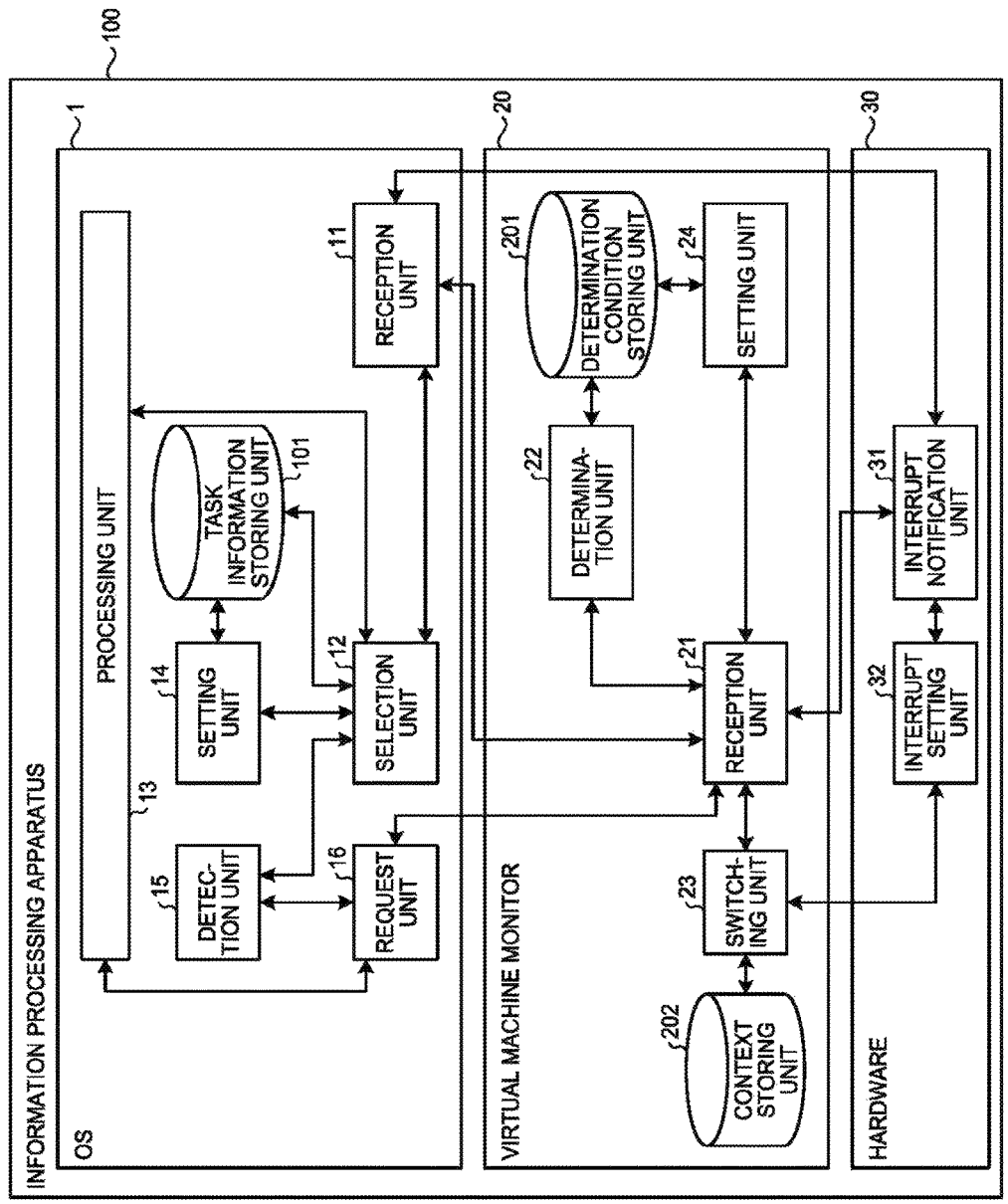

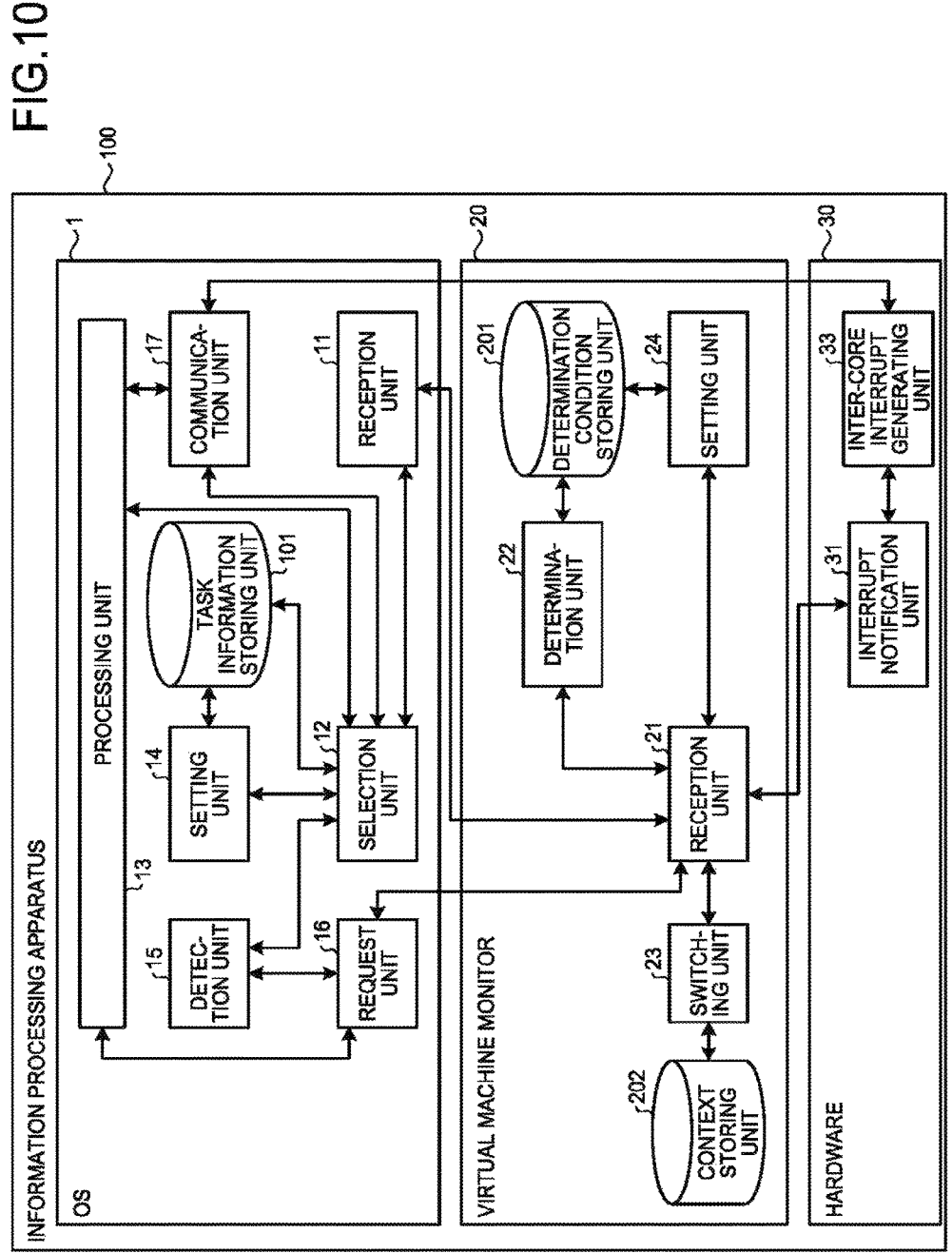

FIG.11B

| INTER-OS COMMUNICA-TION REQUEST SOURCE CORE | OS OPERATING WITH PRIORITY IN REQUEST SOURCE CORE | REQUEST SOURCE OS | REQUEST DESTINA-TION OS | REQUEST SOURCE TASK | DESIGNATED (INTERRUPT-GENERATED) CORE | IS CORE IN WHICH INTERRUPT IS GENERATED OWN CORE? |
|---|---|---|---|---|---|---|
| 1 | OS2 | OS1 | OS2 | NON-REAL TIME | 2 | NO |
| 1 | OS2 | OS2 | OS1 | REAL TIME | 2 | NO |
| 1 | OS2 | OS2 | OS1 | NON-REAL TIME | 1 | YES |
| 2 | OS1 | OS1 | OS2 | REAL TIME | 1 | NO |
| 2 | OS1 | OS1 | OS2 | NON-REAL TIME | 2 | YES |
| 2 | OS1 | OS2 | OS1 | NON-REAL TIME | 1 | NO |

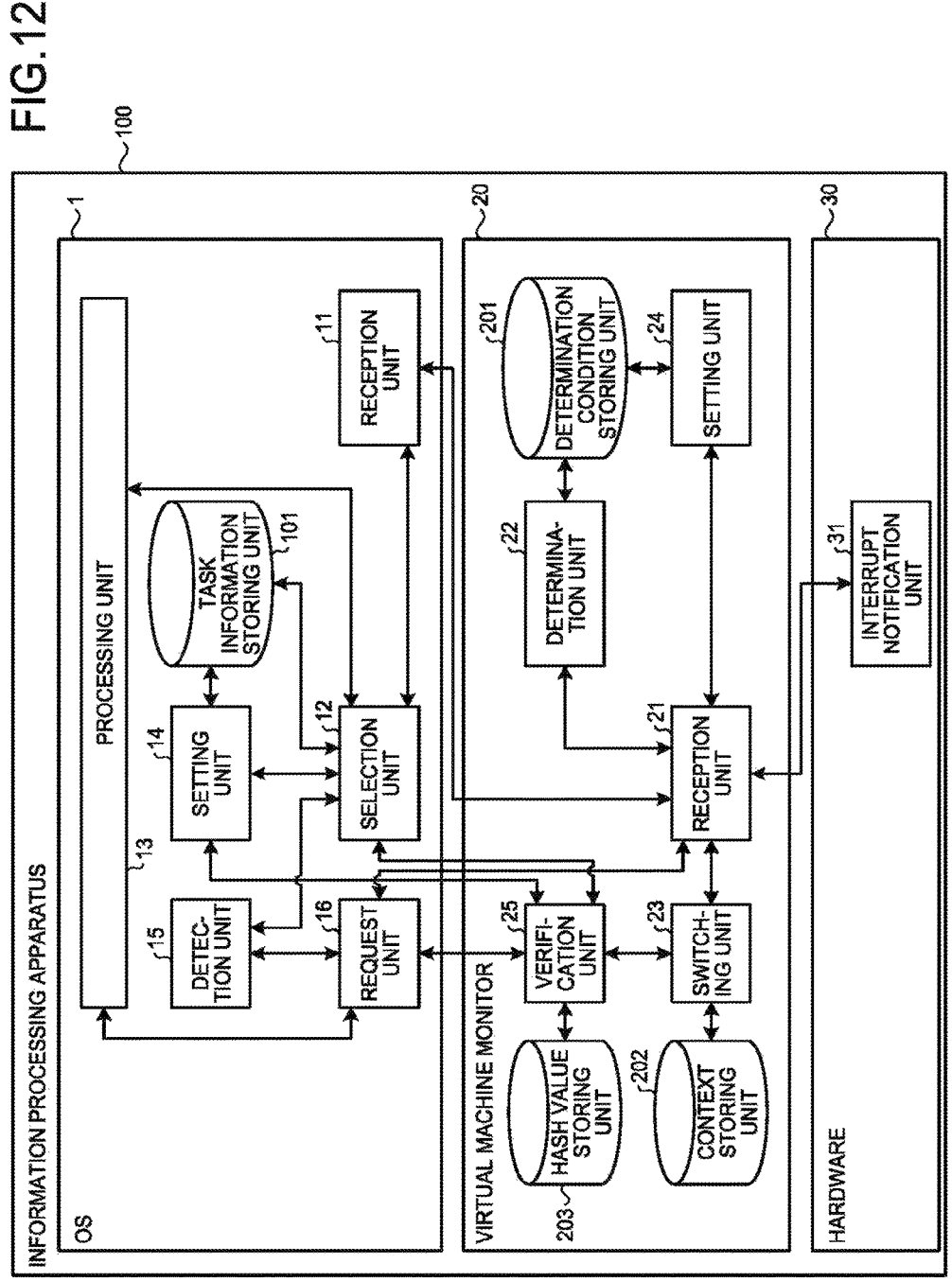

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2016-182171, filed on Sep. 16, 2016; the entire contents of which are incorporated herein by reference.

FIELD

Embodiments described herein relate generally to an information processing apparatus, an information processing method, and a computer program product.

BACKGROUND

Virtualization technologies for executing a plurality of operating systems (OS) on a single computer have been conventionally known. For example, as software controlling the execution of a plurality of operating systems, hypervisors (virtual machine monitors) are widely used. In addition, in apparatuses for engine control of vehicles, factory automation (FA), and the like requiring real-time processing, real-time operating systems configured to be specific to the execution control of real time tasks are widely used.

However, in a conventional technology, it is difficult to efficiently secure real-time processing in a case where real time tasks are present to be distributed in a plurality of operating systems.

BRIEF DESCRIPTION OF THE DRAWINGS

FIG. 2 is a diagram that illustrates an example of the functional configuration of the information processing apparatus according to the first embodiment;

FIG. 3A is a diagram that illustrates an example of interrupt input destination operating system (OS) information according to the first embodiment;

FIG. 3B is a diagram that illustrates an example of priority OS information according to the first embodiment;

FIG. 7B is a diagram that illustrates an example of an interrupt processed according to the flowchart illustrated in FIG. 7A;

FIG. 9 is a diagram that illustrates an example of the functional configuration of an information processing apparatus according to a modified example of the first embodiment;

FIG. 10 is a diagram that illustrates an example of the functional configuration of an information processing apparatus according to a second embodiment;

FIG. 11B is a diagram that illustrates an example of the inter-OS communication request processed according to the flowchart illustrated in FIG. 11A;

FIG. 12 is a diagram that illustrates an example of the functional configuration of an information processing apparatus according to a third embodiment;

DETAILED DESCRIPTION

An information processing apparatus according to an embodiment includes a reception unit and switching unit. The reception unit receives an interrupt. The switching unit that switches a second operating system (which is executing in a core to a first OS to which the interrupt for the first OS is input, when the reception unit receives an interrupt for the core in which the first OS is a priority OS and the second OS is not the priority OS.

Hereinafter, exemplary embodiments of an information processing apparatus, an information processing method, and a computer program product will be described below in detail with reference to the accompanying drawings.

First Embodiment

An information processing apparatus 100 according to a first embodiment includes a processor that includes a plurality of cores. The processor, for example, is a central processing unit (CPU) or a micro processing unit (MPU). For the simplification of description, in the description of the first embodiment, a case where the number of the cores is two will be described. The description may be similarly applied also to a case where the number of the core is one and a case where the number of the cores is three or mere.

First, an example of the system configuration of the information processing apparatus 100 according to the first embodiment will be described.

System Configuration of Information Processing Apparatus

Figure 1:
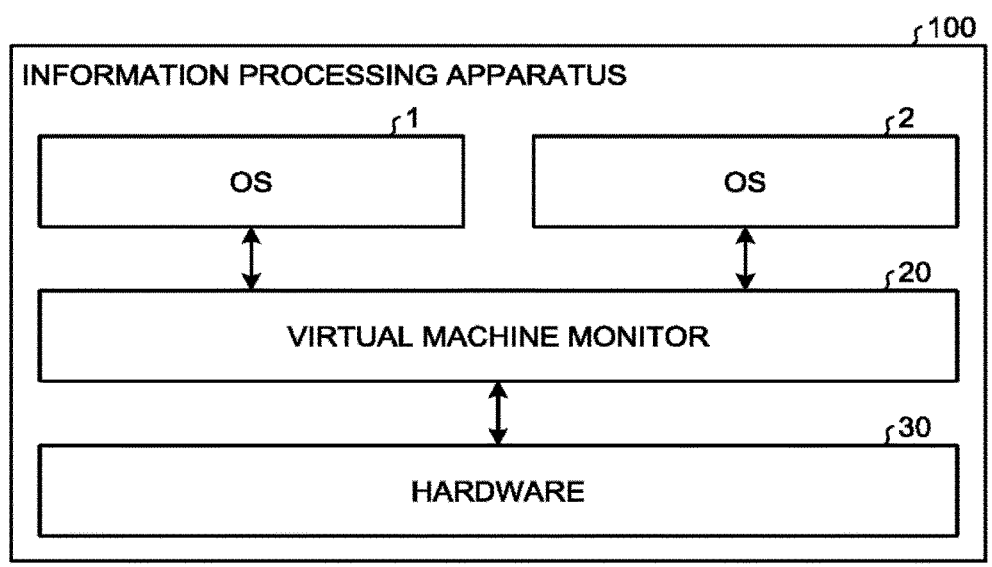
FIG. 1 is a diagram that illustrates an example of the system configuration of an information processing apparatus according to a first embodiment.

FIG. 1 is a diagram that illustrates the example of the system configuration of the information processing apparatus 100 according to the first embodiment. In the information processing apparatus 100 according to the first embodiment, a virtual machine monitor 20 operating on hardware 30 operates an operating system (OS) 1 and an OS 2 in parallel. Hereinafter, in a case where the OS 1 and the OS 2 are not to be discriminated from each other, they will be simply referred to as an OS. The virtual machine monitor 20 performs switching of an OS executed on a core in accordance with a hardware interrupt from the hardware 30, a software interrupt from the OS 1, and a software interrupt from the OS 2.

Next, an example of the functional configuration of the information processing apparatus 100 according to the first embodiment will be described.

Functional Configuration of Information Processing Apparatus

FIG. 2 is a diagram that illustrates an example of the functional configuration of the information processing apparatus 100 according to the first embodiment. The functions of the information processing apparatus 100 according to the first embodiment are realized by the OS 1, the OS 2, the virtual machine monitor 20, and the hardware 30. In the example illustrated in FIG. 2, functions realized by the OS 2 are the same as those realized by the OS 1, and thus, the OS 2 is not illustrated.

The OS 1 includes a reception unit 11, a selection unit 12, a processing unit 13, a setting unit 14, a detection unit 15, a request unit 16, and a task information storing unit 101. The functions of the OS 1, for example, are realized by a CPU executing a program.

The virtual machine monitor 20 includes a reception unit 21, a determination unit 22, a switching unit 23, a setting unit 24, a determination condition storing unit 201, and a context storing unit 202. The functions of the virtual machine monitor 20, for example, are realized by a CPU executing a program.

The hardware 30 includes an interrupt notification unit 31. The interrupt notification unit 31, for example, is realised by a CPU.

When the interrupt is received from an interrupt generation source, the interrupt notification unit 31 notifies the interrupt to the reception unit 21. The interrupt notification unit 31 receives an interrupt for each core.

When the interrupt is received from the interrupt notification unit 31, the reception unit 21 inputs a determination request for determining whether or not OS switching is performed in accordance with the interrupt to the determination unit 22.

When a determination request is received from the reception unit 21, the determination unit 22 determines whether or not OS switching is to be performed by referring to a determination condition stored in the determination condition storing unit 201. The determination condition includes an interrupt input destination OS information and priority OS information.

Interrupt Input Destination OS Information

FIG. 3A is a diagram that illustrates an example of the interrupt input destination OS information according to the first embodiment. The interrupt input destination OS information according to the first embodiment is a table that includes an interrupt field and an input destination OS field. In the interrupt field, a type of an interrupt is stored. In the input destination OS field, a kind of OS of the input destination of an interrupt is stored. The example illustrated in FIG. 3A illustrates a case where an OS to which an interrupt A is input is the OS 1, and an OS to which an interrupt B is input is the OS 2.

Priority OS Information

FIG. 3S is a diagram that illustrates an example of the priority OS information according to the first embodiment. The priority OS information according to the first embodiment is a table that includes a core field and a priority OS field. In the core field, a kind of core of a CPU is stored. In the example illustrated in FIG. 3B, a kind of core is represented by a CPU core number. In the priority OS field, a kind of OS that is prioritized in the core is stored. The example illustrated in FIG. 3B illustrates a case where an OS prioritized in a core 1 is the OS and an OS prioritized in a core 2 is the OS 1.

Referring back to FIG. 2, more specifically, the determination unit 22 performs a determination of OS switching in a case where an OS to which the interrupt is input is a priority OS prioritized in the core in which the interrupt occurs, and an OS that is in the middle of execution in the core is not a prioritized OS of the core.

In Case Where OS Switching Is Performed

In a case where OS switching is performed, the reception unit 21 inputs an OS switching request to the switching unit 23.

The switching unit 23 performs switching (dispatching) of an OS to be operated in a core. More specifically, in a case where an OS is to be dispatched, the switching unit 23 stores a context such as register information of an OS that is currently executed and the like in the context storing unit 202. Then, the switching unit 23 reads (returns) a context of an OS that is a switching destination from the contest storing unit 202.

When an OS switching request is received from the reception unit 21, the switching unit 23 performs storing and returning context described above and executes a program of an OS after the switching. Accordingly, the switching unit 23 performs switching of the OS.

In Case Where OS Switching is Not Performed

In a case where an interrupt is dedicated for the OS that is in the middle of execution, and thus, OS switching is not performed, the reception unit 21 inputs the interrupt to the reception unit 11 of the OS that is in the middle of execution. On the other hand, in a case where the interrupt is an interrupt input to OS that is not prioritized in a core in which the interrupt has been generated, and thus, OS switching is not performed, the reception unit 21 keeps the interrupt on pending, and the OS that is in the middle of execution continues the process.

Case where Switching Request is Received from OS that is in Middle of Execution In a case where a switching request is received from the request unit 16 of the OS that is in the middle of execution, the reception unit 21 determines whether or not the interrupt input to the OS that is the switching destination is on pending. In a case where the interrupt input to the OS that is the switching destination is on pending, the reception unit 21 inputs an OS switching request to the switching unit 23. On the other hand, in a case where the interrupt input to the OS that is the switching destination is not on pending, the OS that is the switching destination resumes the execution from the place that is executed before the switching.

Next, an example of the generation of an interrupt and an example of an OS executed by each core will be described.

Example of Generation of Interrupt and Example of OS Executed by Each Core

Figure 4:
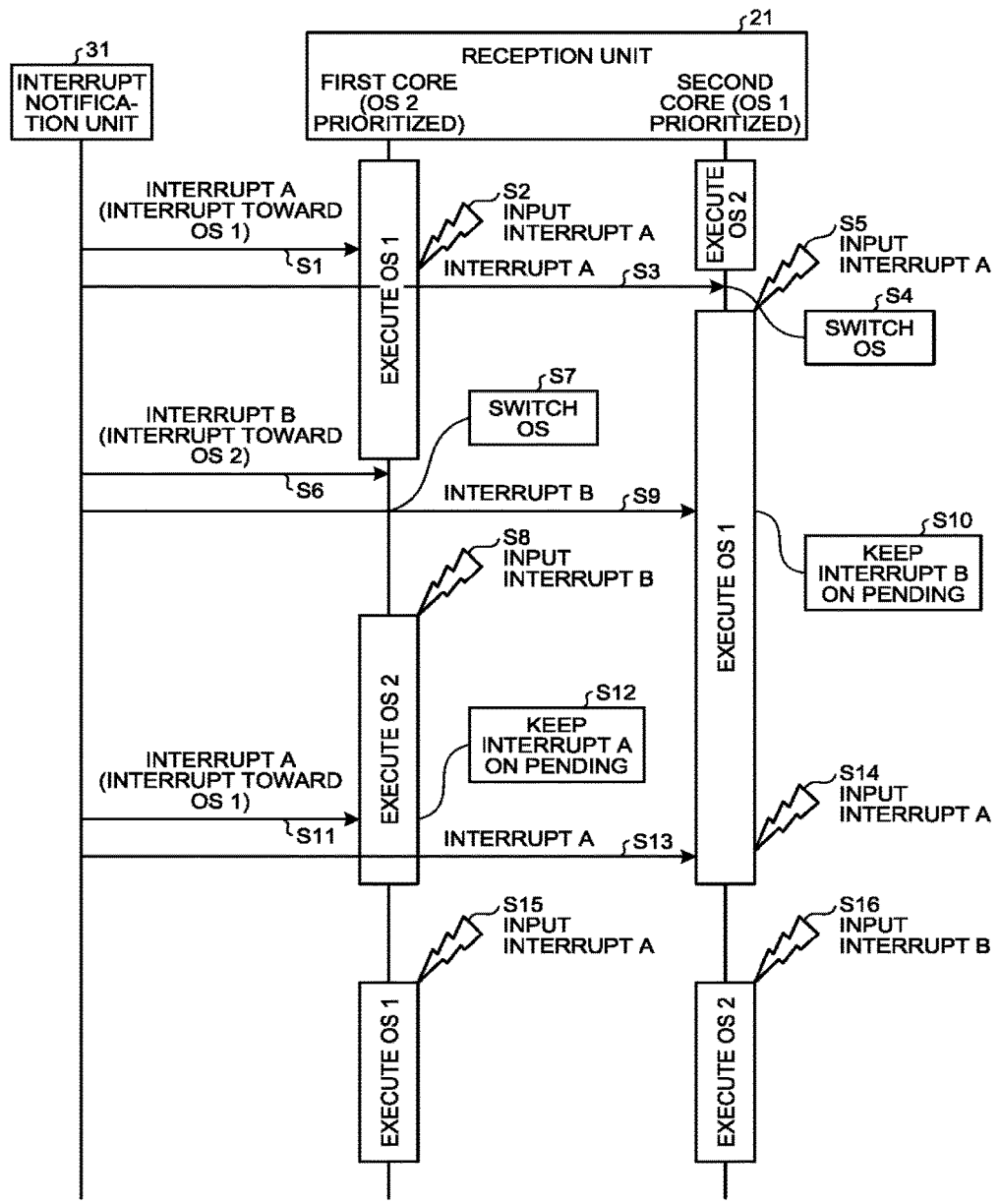
FIG. 4 is a sequence diagram that illustrates an example of generation of an interrupt according to the first embodiment.

FIG. 4 is a sequence diagram that illustrates an example of the generation of an interrupt according to the first embodiment. As illustrated in the sequence diagram of FIG. 4, initially, it is assumed that an OS 1 is executed by a first core having a CPU core number of 1, and an OS 2 is executed by a second core having a CPU core number of 2.

First, the interrupt notification unit 31 notifies an interrupt A for the first core to the reception unit 21 (Step S1). Next, since the interrupt A is an interrupt dedicated for the OS 1, and the OS 1 is already in the middle of execution in the first core, the reception unit 21 inputs the interrupt A to the reception unit 11 of the OS (Step S2).

Next, the interrupt notification unit 31 notifies the interrupt A for the second core to the reception unit 21 (Step S3). Next, since the OS 1 to which the interrupt A is input is a priority OS prioritized in the second core in which the interrupt A has been generated, and the OS 2 that is in the middle of execution in the second core is not a priority OS of the second core, the switching unit 23 switches the OS 2 to the OS 1 (Step S4). Next, the reception unit 21 inputs the interrupt A to the reception unit 11 of the OS 1 (Step S5).

Next, the interrupt notification unit 31 notifies an interrupt B for the first core to the reception unit 21 (Step S6). Next, since the OS 2 to which the interrupt B is input is a priority OS prioritized in the first core in which the interrupt B has been generated, and the OS 1 that is in the middle of execution in the first core is not a priority OS of the first core, the switching unit 23 switches the OS 1 to the OS 2 (Step S7). Next, the reception unit 21 inputs the interrupt E to the reception unit 11 of the OS 2 (Step S8).

Next, the interrupt notification unit 31 notifies the interrupt B for the second core to the reception unit 21 (Step S9). Next, since the OS 2 to which the interrupt B is input is not a priority OS prioritized in the second core in which the interrupt B has been generated, and the OS 1 that is in the middle of execution in the second core is a priority OS of the second core, the reception unit 21 keeps the interrupt B on pending (Step S10).

Next, the interrupt notification unit 31 notifies the interrupt A for the first core to the reception unit 21 (Step S11). Next, since the OS 1 to which the interrupt A is input is not a priority OS prioritized in the first core in which the interrupt A has been generated, and the OS 2 that is in the middle of execution in the first core is a priority OS of the first core, the reception unit 21 keeps the interrupt A on pending (Step S12).

Next, the interrupt notification unit 31 notifies the interrupt A for the second core to the reception unit 21 (Step S13). Next, since the interrupt A is an interrupt dedicated for the OS 1, and the OS 1 is already in the middle of execution in the second core, the reception unit 21 inputs the interrupt A to the reception unit 11 of the OS 1 (Step S14).

Next, when the OS 1 is executed again by the first core, for example, by being triggered upon a case where task, which is executed by the OS 2, operated by the first core disappears or the like, the interrupt A that is on pending by the process of Step S12 is input to the reception unit 11 of the OS 1 (Step S15). Similarly, when the OS 2 is executed again by the second core, for example, by being triggered upon a case where a task, which is executed by the OS 1, operated by the second core disappears or the like, the interrupt B that is on pending by the process of Step S10 is input to the reception unit 11 of the OS 2 (Step S16).

Referring back to FIG. 2, the setting unit 24 sets the interrupt input destination OS information (see FIG. 3A) described above and the priority OS information (see FIG. 3B) described above. The setting unit 24, for example, may be operated by being triggered upon reception of a reset interrupt in the reception unit 21 when the information processing apparatus 100 is started. Furthermore, for example, the setting unit 24 may be operated by being triggered upon reception of an explicit setting request from the OS side in the reception unit 21.

When an interrupt is received from the virtual machine monitor 20, the reception unit 11 of the OS 1 inputs a notification representing the reception of the interrupt to the selection unit 12.

When the notification is received from the reception unit 11, the selection unit 12 refers to task information stored in the task information storing unit 101. Then, the selection unit 12 selects a task to be processed next by the processing unit 13. In other words, the selection unit 12 is a scheduler determining the processing sequence of tasks.

Example of Task information

Figures 5, 6:
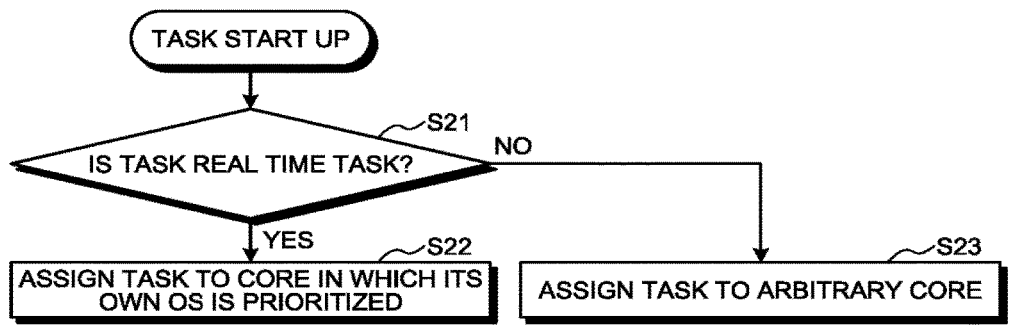
FIG. 5 is a diagram that illustrates an example of task information according to the first embodiment.
FIG. 6 is a flowchart that illustrates an example of a process performed at the time of starting a task according to the first embodiment.

FIG. 5 is a diagram that illustrates an example of the task information according to the first embodiment. The task information according to the first embodiment includes: a task name, a type, an assignment (affinity), and a state. The task name is a name of a task. The type is a type of task. The assignment represents a core to which a task is assigned. The state represents a state of a task.

The task information illustrated in FIG. 5 illustrates an example of the task information of the OS 1. A core in which the OS 1 is executed with priority is the second core (see FIG. 3B).

In the example illustrated in FIG. 5, for example, the type of the task A is a real time task. The real time task is a task having a process priority level higher than a non-real time task. The assignment of the task A is the second core. The state of the task A is "executable".

For example, the type of the task B is the real time task. In addition, the assignment of the task B is the second core. The to of the task B is "I/O standby".

For example, the type of the task C is the non-real time task. The non-real time task is a task having a process priority level lower than a real time task. The assignment of the task C is the first core or the second core. The state of the task C is "execution". In other words, the task C is represented to be a task that is currently in the middle of execution.

Figure 8:
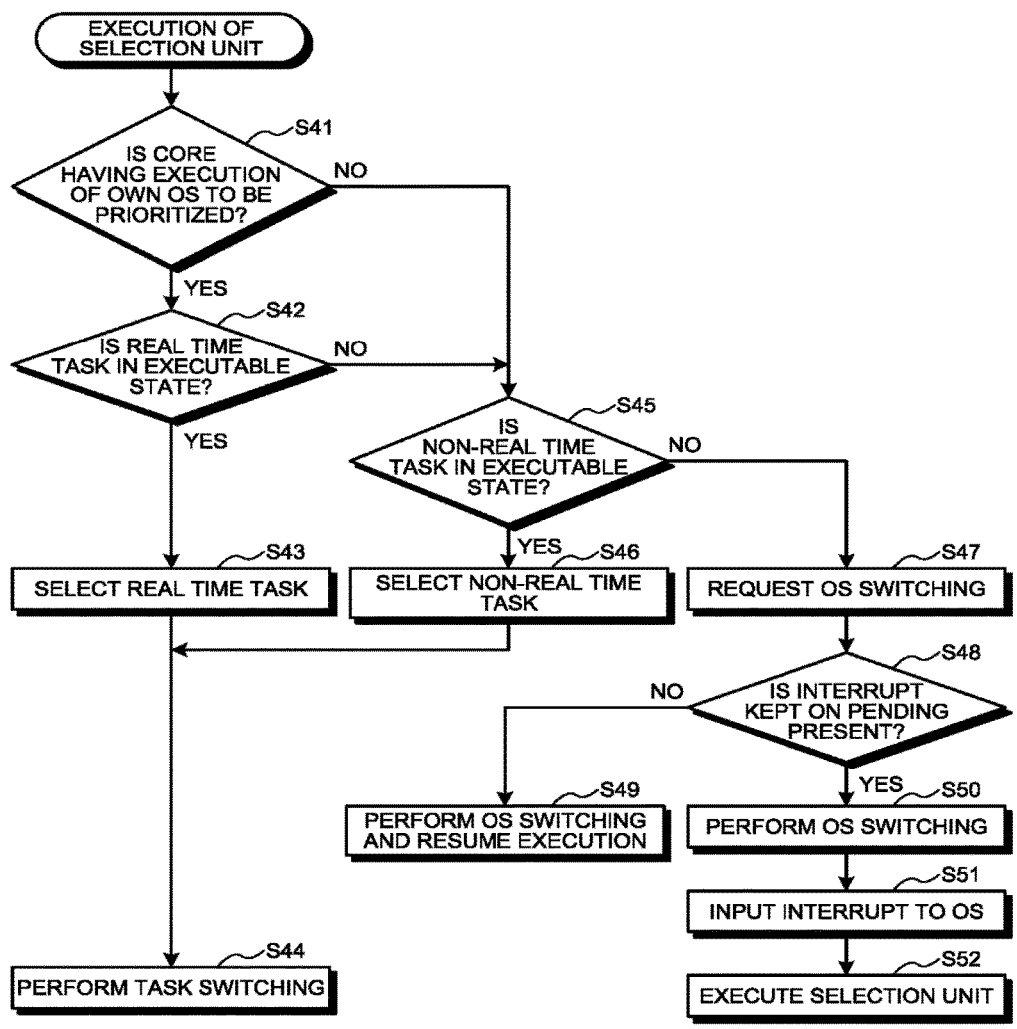
FIG. 8 is a flowchart that illustrates an example of task selecting process according to the first embodiment.

Referring back to FIG. 2, more specifically, the selection unit 12 selects a task, for example, in accordance with an algorithm illustrated in a flowchart of FIG. 8. Then, the selection unit 12 inputs the selected task to the processing unit 13. Accordingly, the task is processed by the processing unit 13. In addition, the selection unit may use real time scheduling such as earliest deadline first (EDF) scheduling that is generally known.

In addition, the selection unit 12 inputs a setting request of the task information to the setting unit 14.

Setting of Task Information

When a setting request is received from the selection unit 12, the setting unit 14 sets the task information described above.

The type of task, for example, may be statically set when the task is started up. In addition, for example, the type of task may be set by being triggered upon reception of a notification representing the type of task in the selection unit 12 from the processing unit 13.

For the assignment of a real time task, the setting unit 14 assigns the task to a core in which an OS executing the real time task is set as a priority OS. On the other hand, for the assignment of a non-real time task, the setting unit 14 may not limit a core to be operated but may assign the task to a core in which an OS executing the non-real time task is not set as a priority OS. Generally, a function for fixing a core executing a task is included in many operating systems as an affinity function, and, for example, the setting unit 14 may be realized by using the affinity function.

The state of a task, for example, is set as an I/O standby state→an executable state→an executing state as the setting unit 14 receives a setting request of the state of the task from the selection unit 12 at any time.

In addition, in the case of an idle state in which there is no task of the executable state, the selection unit 12 notifies the detection unit 15 of no presence of a task of the executable state.

When a notification is received from the selection unit 12, the detection unit 15 inputs a switching request of an OS to the request unit 16. When the switching request is received from the detection unit 15, the request unit 16, for example, inputs the switching request to the reception unit 21 of the virtual machine monitor 20 by using a software interrupt or the like. In the case of the idle state, the OS can be switched by using the functions of the detection unit 15 and the request unit 16, and accordingly, a CPU cores can be efficiently used.

Next, an information processing method according to the first embodiment will be described.

Process Performed at Time of Starting Task

FIG. 6 is a flowchart that illustrates an example of a process performed at the time of starting a task according to the first embodiment. First, the selection unit 12 determines whether or not a started task is a real time task (Step S21).

In a case where the started task is a real time ask (Step S21: Yes), the setting unit 14 assigns the task to core in which its own OS is prioritized (Step S22). On the other hand, in a case where the started task is not a real time task (Step S21: No), in other words, in a case where the started task is a non-real time task, the setting unit 14 assigns the task to an arbitrary core (Step S23). In addition, the process of Step S23 may be changed to a process in which the setting unit 14 assigns the non-real time task to a core in which its own OS is not prioritized.

Process Performed at Time of Generating Interrupt

Figure 7A:
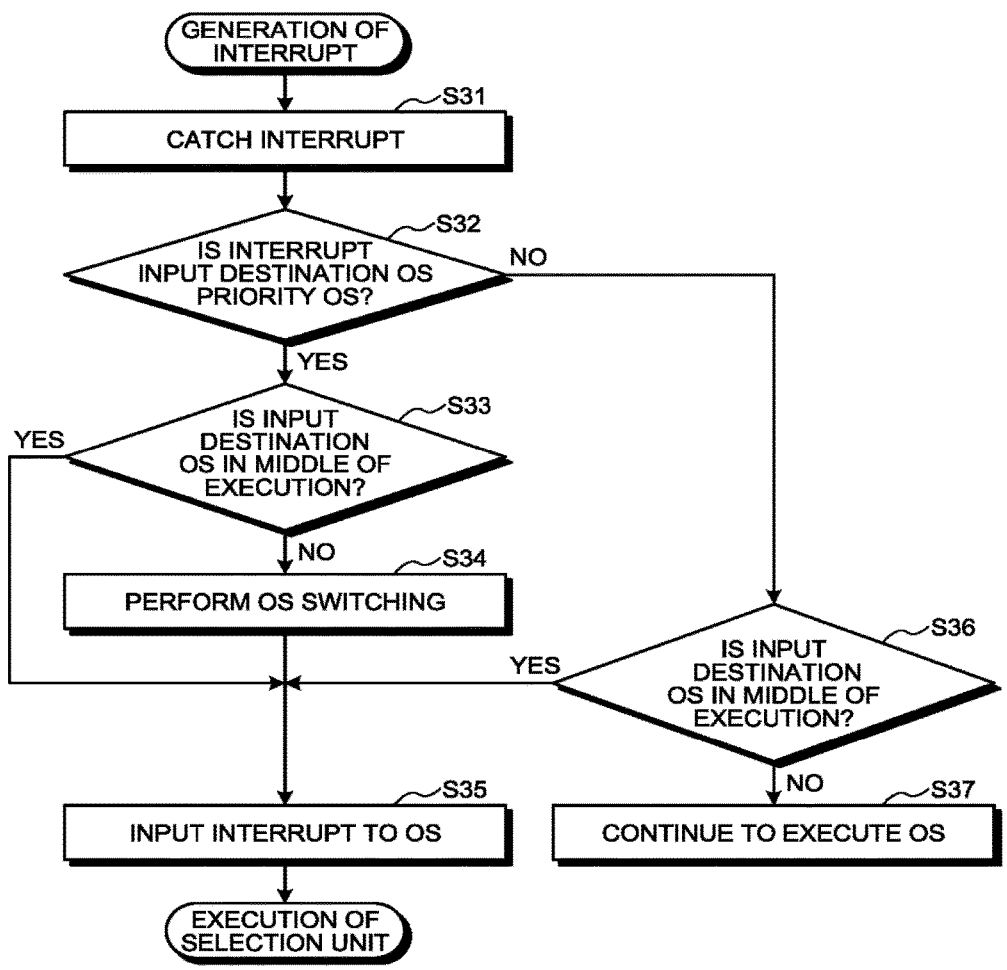
FIG. 7A is a flowchart that illustrates an example of a process performed at the time of generating an interrupt according to the first embodiment.

FIG. 7A is a flowchart that illustrates an example of a process performed at the time of generating an interrupt according to the first embodiment. First, the reception unit 21 catches an interrupt by receiving the interrupt from the interrupt notification unit 31 (Step S31).

Next, the determination unit 22 determines whether or not an input destination OS of the interrupt received in the process of Step S31 is a priority OS of a core in which the interrupt is generated (Step S32). More specifically, the determination unit 22 specifies an input destination OS of the interrupt based on the interrupt input destination OS information (see FIG. 3A). Then, the determination unit 22 determines whether input destination OS of the interrupt is a priority OS of a core in which the interrupt has been generated based on the priority OS information (see FIG. 3B).

In a case where the input destination OS is a priority OS (Step S32: Yes), the determination unit 22 determines whether or not the input destination OS is in the middle of execution (Step S33). In a case where the input destination OS is in the middle of execution (Step S33: Yes), the reception unit 21 inputs the interrupt received by the process of Step S31 to the reception unit 11 of the OS that is in the middle of execution (Step S35).

In a case where the input destination OS is not in the middle of execution (Step S33: No), the switching unit 23 switches the OS that is currently in the middle of execution to the input destination OS of the interrupt received by the process of Step S31 (Step S34). Next, the reception unit 21 inputs the interrupt received by the process of Step S31 to the reception unit 11 of the OS after the switching (Step S35).

On the other hand, in a case where the input destination OS is not a priority OS (Step S32: No), the determination unit 22 determines whether or not the input destination OS is in the middle of execution (Step S35). In a case where the input destination OS is in the middle of execution (Step S36: Yes), the reception unit 21 inputs the interrupt received by the process of Step S31 to the reception unit 11 of the OS that is in the middle of execution (Step S35).

In a case where the input destination OS is not in the middle of execution (Step S36: No), the reception unit 21 keeps the interrupt received by the process of Step S31 on pending, and the OS that is currently executed continues the process (Step S37).

After the interrupt is input to the OS by the process of Step S35 described above, the selection unit 12 of the OS executes the interrupt. The process of the selection unit 12 will be described later with reference to a flowchart of FIG. 8.

Example of Process of Interrupt

FIG. 7B is a diagram that illustrates an example of an interrupt processed according to the flowchart illustrated in FIG. 7A.

For example, in a case where a CPU core number of a core in which the interrupt A is generated is "1", and an OS executed immediately before the generation of the interrupt A is the OS 1, OS switching is not performed, and the interrupt A is input to the OS 1. On the other hand, in a case where a CPU core number of a core in which the interrupt A is generated is "1", and an OS executed immediately before the generation of the interrupt A is the OS 2, OS switching is not performed, and the input of the interrupt A to the OS 1 is kept to be on pending.

In addition, for example, in a case where a CPU core number of a core in which the interrupt B is generated is "1", and an OS executed immediately before the generation of the interrupt B is the OS 1, after the OS 1 is switched to the OS 2, the interrupt B is input to the OS 2. On the other hand, in a case where a CPU core number of a core in which the interrupt B is generated is "1", and an OS executed immediately before the generation of the interrupt B is the OS 2, OS switching is not performed, and the interrupt B is input to the OS 2.

Task Selecting Process

FIG. 8 is a flowchart that illustrates an example of a task selecting process according to the first embodiment. The process of the selection unit 12, for example, is performed in a case where an interrupt is received by the reception unit 11. In addition, for example, the process of the selection unit 12 is performed in a case where an operation request of the selection unit 12 is explicitly received from the processing unit 13.

First, the selection unit 12 determines whether or not a core in which the operation of the selection unit 12 is executed is a core in which the execution of its own OS including the selection unit 12 is prioritized (Step S41).

In a case where the core is a core in which the execution of its own OS is prioritized (Step S41: Yes), the selection unit 12 determines whether or not a real time task is in the executable state (Step S42). In a case where the real time task is in the executable state (Step S42: Yes), the selection unit 12 selects the real time task (Step S43). Next, the selection unit 12 switches to the real time task selected by the process of Step S43 (Step S44).

On the other hand, in a case where the core is not a core in which the execution of its own OS is prioritized (Step S41: No) or a case where a real time task is not in the executable state (Step S42: No), the selection unit 12 determines whether or not a non-real time task is in the executable state (Step S45).

In a case where the non-real time task is in the executable state (Step S45: Yes), the selection unit 12 selects the non-real time task (Step S46). Next, the selection unit 12 switches to the non-real time task selected by the process of Step S46 (Step S44).

On the other hand, in a case where the non-real time task is not in the executable state (Step 345: No), in other words, in a case where an idle state in which no task executed by its own OS is present is detected by the detection unit 15, the request unit 16 inputs a switching request of the OS to the reception unit 21 by using a software interrupt or the like (Step S47).

Next, the switching unit 23 determines whether or not an interrupt kept on pending for being input to the switching destination OS is present (Step S48).

In a case where an interrupt kept on pending is not present (Step S48: No), the switching unit 23 performs switching of the OS, and the switching destination OS resumes the execution from a place executed before the switching (Step S49).

On the other hand, in a case where an interrupt kept on pending is present (Step S48: Yes), the switching unit 23 performs switching of the OS (Step S50). Next, the reception unit 21 inputs an interrupt to the reception unit 11 of the OS after the switching (Step S51). Next, the selection unit 12 of the OS after the switching performs a task selecting process (Step S52).

As described above, according to the information processing apparatus 100 of the first embodiment, a real time task of each OS can be assigned to a core having a high priority level, and, also in a case where real time tasks are mixed in operating systems, real-time processing can be secured without the hypervisor referring to the affinity information of a task included in each OS. In addition, in the information processing apparatus 100 according to the first embodiment, only the priority levels of operating systems and the input destination operating systems of interrupts may be set for each core. The setting of interrupt input destination operating systems is a setting required for using the hypervisor regardless whether or not the real-time hypervisor is used, and only a determination of a prioritized OS for each core is substantially an additional operation. In this way, according to the information processing apparatus 100 of the first embodiment, a small amount of effort is required for a change from an existing system or applications.

Modified Example of First Embodiment

Next, a modified example of the first embodiment will be described. In descriptions of the modified example of the first embodiment, the descriptions similar to those of the first embodiment will not be presented, and parts different from those of the first embodiment will be described. The description of the system configuration of the information processing apparatus 100 according to the modified example of the first embodiment is the same as that of the system configuration (see FIG. 1) of the information processing apparatus 100 according to the first embodiment and thus, will not be presented.

Functional Configuration of Information Processing Apparatus

FIG. 9 is a diagram that illustrates an example of the functional configuration of the information processing apparatus 100 according to the modified example of the first embodiment. The functions of the information processing apparatus 100 according to the modified example of the first embodiment are realized by an OS 1, an OS 2, a virtual machine monitor 20, and hardware 30. In the example illustrated in FIG. 9, functions realized by the OS 2 are the same as those realized by the OS 1, and thus, the OS 2 is not illustrated.

The OS 1 includes a reception unit 11, a selection unit 12, a processing unit 13, a setting unit 14, a detection unit 15, a request unit 16, and a task information storing unit 101. The functions of the OS 1, for example, are realized by a CPU executing a program.

The virtual machine monitor 20 includes a reception unit 1, a determination unit 22, a switching unit 23, a setting unit 24, a determination condition storing unit 201, and a context storing unit 202. The functions of the virtual machine monitor 20, for example, are realized by a CPU executing a program.

The hardware 30 includes an interrupt notification unit 31 and an interrupt setting unit 32. The interrupt notification unit 31 and the interrupt setting unit 32, for example, are realized by a CPU.

In other words, in the modified example of the first embodiment, the interrupt setting unit 32 is added to the information processing apparatus 100, which is different from the first embodiment.

In the first embodiment, while all the interrupts are input to the OS 1 through the reception unit 21, in this modified example, some interrupts are directly input to the reception unit 11 of the OS 1 by an interrupt notification unit 31 of the hardware 30. Accordingly, a transition to the virtual machine monitor 20 is not necessary, and thus, the operation of the information processing apparatus 100 can be performed at a high speed. Among CPUs of recent years, there are many cases where an interrupt controller of a CPU supports interrupt inputs to both the virtual machine monitor 20 and the OS 1. In a case where the CPU supporting interrupt inputs to both the virtual machine monitor 20 and the OS 1 is used, the configuration of this modified example is useful.

In this modified example, when OS switching is performed, the switching unit 23 inputs a setting request of an interrupt input to the interrupt setting unit 32. When the setting request of the interrupt input is received from the switching unit 23, the interrupt setting unit 32 changes the setting of the interrupt input based on the setting request. The interrupt notification unit changes an input destination of an interrupt in accordance with the setting of the interrupt input performed by the interrupt setting unit 32 after the OS switching is performed.

Case where Switching Destination OS is Priority OS

In a case where a switching destination OS is a priority OS, the switching unit 23 inputs a setting request for directly inputting an interrupt, which is input to the switching destination OS, to the reception unit 11 of the OS to the interrupt setting unit 32. In addition, the switching unit 23 inputs a setting request for keeping an interrupt, which is not input to the switching destination OS, on pending to the interrupt setting unit 32.

Case where Switching Destination OS is not Priority OS

On the other hand, in a case where a switching destination OS is not a priority OS, the switching unit 23 inputs a setting request for directly inputting an interrupt, which is input to the switching destination OS, to the reception unit 11 of the OS to the interrupt setting unit In addition, the switching unit 23 inputs a setting request for inputting an interrupt, which is input to the priority OS, to the reception unit 21 to the interrupt setting unit 32. Furthermore, the switching unit 23 inputs a setting request for keeping an interrupt, which is input to the other OS (in a case where three or more operating systems are operated), on pending to the interrupt setting unit 32.

Here, a case will be described more specifically in which the information processing apparatus 100 includes the interrupt input destination OS information illustrated in FIG. 3A described above and the priority OS information illustrated in FIG. 3B described above.

Case where Core Receiving Interrupt is First Core

In the first core having a CPU core number of "1", the OS 2 is a priority OS. For this reason, in a case where the OS after the switching is the OS 1, the switching unit 23 inputs a setting request for inputting an interrupt A to the reception unit 11 of the OS 1 and a setting request for inputting an interrupt B to the reception unit 21 to the interrupt setting unit 32. In addition, in a case where the OS after the switching is the OS 2, the switching unit 23 inputs a setting request for keeping the interrupt A on pending and a setting request for directly inputting the interrupt B to the reception unit 11 of the OS 2 to the interrupt setting unit 32.

Case Where Core Receiving Interrupt Is Second Core In the second core having a CPU core number of "2", the OS 1 is a priority OS. For this reason, in a case where the OS after the switching is the OS 1, the switching unit 23 inputs a setting request for inputting an interrupt A to the reception unit 11 of the OS 1 and a setting request for keeping an interrupt B on pending to the interrupt setting unit 32. In addition, in a case where the OS after the switching is the OS 2, the switching unit 23 inputs a setting request for inputting the interrupt A to the reception unit 21 and a setting request for directly inputting the interrupt B to the reception unit 11 of the OS 2 to the interrupt setting unit 32.

In a case where an interrupt request is present according to the setting of the interrupt setting unit 32, the interrupt notification unit 31 gives a notification of the interrupt. The interrupt notification unit 31 does not perform any process in a case where the interrupt is set to be on pending and inputs the interrupt to the reception unit 21 or the reception unit 11 of the OS in accordance with the setting in a case where the interrupt is not set to be on pending. The interrupt kept on pending is input to the reception unit 11 of the OS in a pending-released stage, in other words, at the time of switching to an OS other than a priority OS.

As described above, according to the modified example of the first embodiment, some interrupts are directly input to the OS. Accordingly, a transition to the virtual machine monitor 20 is limited to a case where OS switching is necessary, and the number of unnecessary transitions to the virtual machine monitor 20 is decreased. For this reason, the information processing apparatus 100 according to the modified example of the first embodiment can operate at a speed higher than that of the information processing apparatus 100 according to the first embodiment.

Second Embodiment

Next, a second embodiment will be described. In descriptions of the second embodiment, the descriptions similar to those of the first embodiment will not be presented, and parts different from those of the first embodiment will be described. The description of the system configuration of an information processing apparatus 100 according to the second embodiment is the same as that of the system configuration (see FIG. 1) of the information processing apparatus 100 according to the first embodiment and thus, will not be presented.

In the information processing apparatus 100 according to the first embodiment, the communication over operating systems is not considered. For example, there is a use case where a secure OS having a high security level and a general OS having a security level lower than the secure OS are present together. For example, in a case where many processes are performed on a general OS, and security-related processes such as an encryption process and the like are performed on a secure OS, the general OS requests the secure OS to perform the security-related processes and uses a process result thereof. In such a case, the communication over an operating system is necessary. In a case where such communication Is not over a core, the communication can be performed using a technology of a shared memory or the like in the configuration (see FIG. 2) of the information processing apparatus 100 according to the first embodiment. However, in a case where the communication over a core is performed, in the configuration of the information processing apparatus 100 according to the first embodiment, there is no structure for the communicating between cores, and, in a case where a calling destination OS is not executed, it is necessary to wait until the calling destination OS is executed next time. Accordingly, the communication is not efficiently performed, and there is a disadvantage that real-time processing is degraded in the case of a real-time process. In the second embodiment, a configuration of a case where the communication is performed over an OS will be described.

Functional Configuration of Information Processing Apparatus

FIG. 10 is a diagram that illustrates an example of the functional configuration of the information processing apparatus 100 according to the second embodiment. The functions of the information processing apparatus 100 according to the second embodiment are realized by an OS 1, an OS 2, a virtual machine monitor 20, and hardware 30. In the example illustrated in FIG. 10, functions realized by the OS 2 are the same as those realized by the OS 1, and thus, the OS 2 is not illustrated.

The OS 1 includes a reception unit 11, a selection unit 12, a processing unit 13, a setting unit 14, a detection unit 15, a request unit 16, a communication unit 17, and a task information storing unit 101. In other words, in the second embodiment, the communication unit 17 is added to the configuration of the first embodiment. The functions of the OS 1, for example, are realized by a CPU executing a program.

The virtual machine monitor 20 includes a reception unit 21, a determination unit 22, a switching unit 23, a setting unit 24, a determination condition storing unit 201, and a context storing unit 202. The functions of the virtual machine monitor 20, for example, are realized by a CPU executing a program.

The hardware 30 includes an interrupt notification unit 31 and an inter-core interrupt generating unit 33. The interrupt notification unit 31 and the inter-core interrupt generating unit 33, for example, are realized by a CPU. In other words, in the second embodiment, the inter-core interrupt generating unit 33 is added to the configuration according to the first embodiment.

In a case where an inter-OS communication request requesting for inter-OS communication is received from the processing unit 13, the communication unit 17 inputs an inter-core interrupt request requesting for the generation of an inter-core interrupt to the inter-core interrupt generating unit 33. In the inter-core interrupt request, a core in which an interrupt is generated is designated. For example, in a case where an inter-OS communication request is received from a real time task, the real-time processing is required, and accordingly, the communication unit 17 designates a core in which the execution of a calling destination OS is prioritized in the inter-core interrupt request.

A case will be described in which the information processing apparatus 100 according to the second embodiment includes the priority OS information, for example, illustrated in FIG. 3B. For example, in a case where an inter-OS communication request from a real time task of the OS 2 operating in the first core to the OS 1 is received, the communication unit 17 of the OS 2 inputs an inter-core interrupt request in which the second core, in which the operation of the OS 1 is prioritized, is designated to the inter-core interrupt generating unit 33.

On the other hand, for example, in a case where an inter-OS communication request from a non-real time task of the OS 2 operating in the first core to the OS 1 is received, the communication unit 17 of the OS inputs an inter-core interrupt request in which the first core, in which the operation of the OS 1 is not prioritized, is designated to the inter-core interrupt generating unit 33. In addition, for example, in a case where an inter-OS communication request from a non-real time task of the OS 2 operating in the second core to the OS 1 is received, the communication unit 17 of the OS 2 inputs an inter-core interrupt request in which the first core, in which the operation of the OS 1 is not prioritized, is designated to the inter-core interrupt generating unit 33.

When an inter-core interrupt request is received from the communication unit 17, the inter-core interrupt generating unit 33 generates an interrupt of a core designated in the inter-core interrupt request. The interrupt notification unit 31 inputs the interrupt generated by the inter-core interrupt generating unit 33 to the reception unit 21.

Figure 11A:
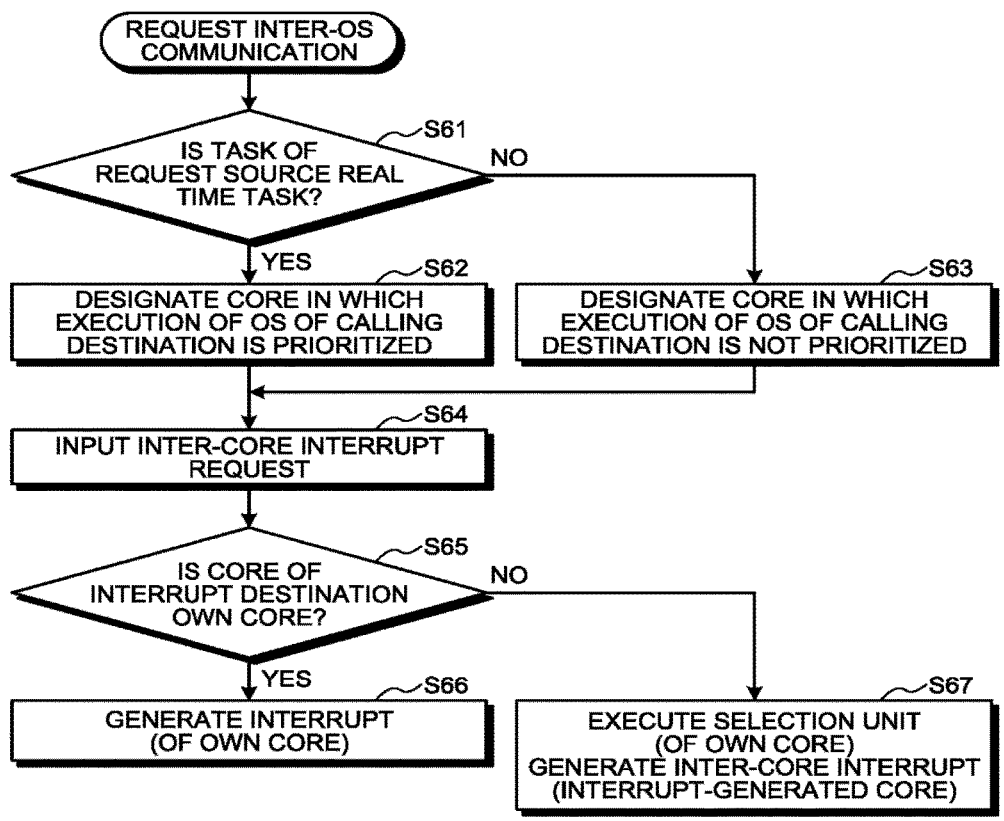
FIG. 11A is a flowchart that illustrates an example of a process of an inter-OS communication request according to the second embodiment.

FIG. 11A is a flowchart that illustrates an example of a process of an inter-OS communication request according to the second embodiment. First, the communication unit 17 determines whether or not a task of a request source is a real time task (Step S61). In a case where the task of the request source is a real time task (Step S61: Yes), the communication unit 17 designates a core in which the execution of the OS of the calling destination is prioritized in an inter-core interrupt request (Step S62). On the other hand, in a case where the task of the request source is not a real time task (Step S61: No), the communication unit 17 designates a core in which the execution of the OS of the calling destination is not prioritized in an inter-core interrupt request (Step S6)

Next, the communication unit 17 inputs the inter-core interrupt request to the inter-core interrupt generating unit 33 (Step S64).

In a case where the core of the interrupt destination is the own core (Step S65: Yes), the inter-core interrupt generating unit 33 generates an interrupt of the own core (Step S66). The interrupt generated by the process of Step S66 is input to the reception unit 21 by the interrupt notification unit 31 as an interrupt of the own core.

On the other hand, in a case where the core of the interrupt destination is not the own core (Step S65: No), the selection unit 12 of the own core continues the process, and the inter-core interrupt generating unit 33 generates an interrupt of the core designated in the inter-core interrupt request (Step S67). The interrupt generated by the process of Step S67 is input to the reception unit 21 as an interrupt of the core designated in the inter-core interrupt request by the interrupt notification unit 31.

Example of Process of Inter-OS Communication Request

FIG. 11B is a diagram that illustrates an example of the inter-OS communication request processed according to the flowchart illustrated in FIG. 11A.

For example, in a case where the communication unit 17 of the OS 1 operating in the first core receives an inter-OS communication request for the OS 2 from a non-real time task of the OS 1, the communication unit 17 designates the second core in which the OS 2 is not executed with priority in an inter-core interrupt request.

On the other hand, in a case where the communication unit 17 of the OS 1 operating in the second core receives an inter-OS communication request for the OS 2 from a real time task of the OS 1, the communication unit 17 designates the first core in which the OS 2 is executed with priority in an inter-core interrupt request.

In addition, for example, in a case where the communication unit 17 of the OS 2 operating in the first core receives an inter-OS communication request for the OS 1 from a non-real time task of the OS 2, the communication unit 17 designates its own core in which the OS 2 is not executed with priority in an inter-core interrupt request.

Description of the process after the reception unit 21 receives an interrupt is similar to the description (see FIG. 7A) of the first embodiment, and thus, the description will not be presented.

As described above, according to the information processing apparatus 100 of the second embodiment, communication over an OS can be performed while the real-time processing is maintained. For this reason, according to the information processing apparatus 100 of the second embodiment, a flexible design of an application such as a real-time application over an OS can be performed.

Third Embodiment

Next, a third embodiment will be described. In descriptions of the third embodiment, the descriptions similar to those of the first embodiment will not be presented, and parts different from those of the first embodiment will be described. The description of the system configuration of an information processing apparatus 100 according to the third embodiment is the same as that of the system configuration (see FIG. 1) of the information processing apparatus 100 according to the first embodiment and thus, will not be presented.

In the information processing apparatus 100 according to the first embodiment, the completeness of the operating systems and the virtual machine monitor is not secured. For this reason, for example, in a case where malware or the like penetrates into the OS, there is a possibility that the process of each function of the OS is rewritten. Although the OS of which the process of each function is rewritten has no influence on the other operating systems, there is a possibility that the operation of a real time task its own OS is blocked, and accordingly, there is a possibility of a significant influence thereof.

Functional Configuration of Information Processing Apparatus

FIG. 12 is a diagram that illustrates an example of the functional configuration of the information processing apparatus 100 according to the third embodiment. The functions of the information processing apparatus 100 according to the third embodiment are realized by an OS 1, an OS 2, a virtual machine monitor 20, and hardware 30. In the example illustrated in FIG. 12, functions realized by the OS 2 are the same as those realized by the OS 1, and thus, the OS 2 is not illustrated.

The OS 1 includes a reception unit 11, a selection unit 12, a processing unit 13, a setting unit 14, a detection unit 15, a request unit 16, and a task information storing unit 101. The functions of the OS 1, for example, are realized by a CPU executing a program.

The virtual machine monitor 2C includes a reception unit 21, a determination unit 22, a switching unit 23, a setting unit 24, a verification unit 25, a determination condition storing unit 201, a context storing unit 202, and a hash value storing unit 203. In other words, in the third embodiment, the verification unit 25 and the hash value storing unit 203 are added to the configuration of the first embodiment. The functions of the virtual machine monitor for example, are realized by a CPU executing a program.

The hardware 30 includes an interrupt notification unit 31. The interrupt notification unit 31, for example, is realized by a CPU.

The verification unit 25 sets programs realizing significant functional blocks, for example, of the selection unit 12, the setting unit 14, the request unit 16, and the like as data of verification targets of alterations and verifies completeness of the data of each of the verification targets of alterations. More specifically, the verification unit 25 stores a hash value (second hash value) of each functional block in the hash value storing unit 203 in advance. Then, the verification unit 25 compares a hash value (first hash value) calculated at timing at which a verification is performed with the hash value (second hash value) stored in advance by using a verification algorithm, thereby verifying the completeness of data of each of the detection targets of alterations. The verification algorithm may be an arbitrary algorithm. The verification algorithm, for example, is a well-known hash-based verification algorithm such as SHA1.

As timing at which a verification of significant functional blocks (for example, the selection unit 12, the setting unit 14, and the request unit 16), for example, when the switching unit 23 performs OS switching, the verification of the significant functional blocks of a switching destination OS is requested. In addition, for example, as the timing at which a verification of the significant functional blocks is performed, when an OS is started up, the verification unit 25 may verify the significant functional blocks once.

According to the information processing apparatus 100 of the third embodiment, the completeness of significant functional blocks, for example, such as the selection unit 12, the setting unit 14, the request unit 16, and the like can be verified.

Modified Example of Third Embodiment

Next, a modified example of the third embodiment will be described. In descriptions of the modified example of the third embodiment, the descriptions similar to those of the third embodiment will not be presented, and parts different from those of the third embodiment will be described. The description of the system configuration of the information processing apparatus 100 according to the modified example of the third embodiment is the same as that of the system configuration (see FIG. 1) of the information processing apparatus 100 according to the first embodiment and thus, will not be presented.

In the configuration of the information processing apparatus 100 according to the third embodiment described above, while an alteration can be detected, the alteration cannot be prevented. As an example of the alteration of the data of an OS, for example, in a case where the priority OS information (see FIG. 3B) is altered, there is a possibility that the operations of the other operating systems are blocked, and accordingly, the priority OS information needs to be protected carefully.

Functional Configuration of Information Processing Apparatus

Figure 13:
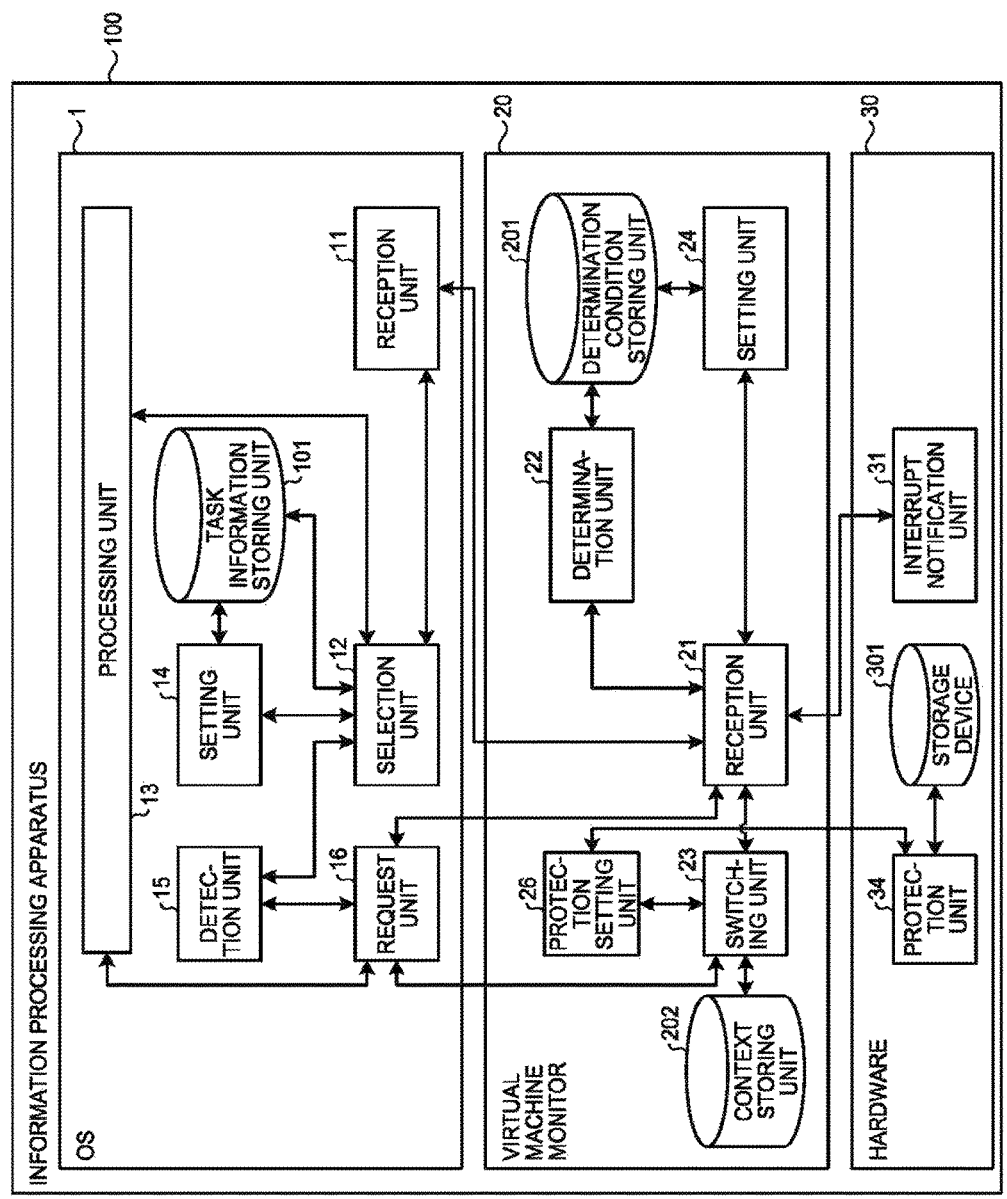
FIG. 13 is a diagram that illustrates an example of the functional configuration of an information processing apparatus according to a modified example of the third embodiment.

FIG. 13 is a diagram that illustrates an example of the functional configuration of the information processing apparatus 100 according to the modified example of the third embodiment. The functions of the information processing apparatus 100 according to the modified example of the third embodiment are realized by an OS 1, an OS 2, a virtual machine monitor 20, and hardware 30. In the example illustrated in FIG. 13, functions realized by the OS 2 are the same as those realized by the OS 1, and thus, the OS 2 is not illustrated.

The OS 1 includes a reception unit 11, a selection unit 12, a processing unit 13, a setting unit 14, a detection unit 15, a request unit 16, and a task information storing unit 101. The functions of the OS, for example, are realized by a CPU executing a program.

The virtual machine monitor 20 includes a reception unit, a determination unit 22, a switching unit 23, a setting unit 24, a protection setting unit 26, a determination condition storing unit 201, and a context storing unit 202. The functions of the virtual machine monitor 20, for example, are realized by a CPU executing a program.

The hardware 30 includes an interrupt notification unit 31, a protection unit 34, and a storage device 301. The interrupt notification unit 31 and the protection unit 34, for example, are realized by a CPU.

In the modified example of the third embodiment, instead of the verification unit 25 of the information processing apparatus 100 according to the third embodiment, the protection setting unit 26 and the protection unit 34 are included.

The protection setting unit 26 sets protection target data among data stored in the storage device 301 to be unalterable through the protection unit 34. The protection target data, for example, represents programs realizing the selection unit 12, the setting unit 14, and the request unit 16, programs realizing the functional blocks of the virtual machine monitor 20, the determination condition storing unit 201, and the context storing unit 202.

The protection unit 34 may be realized, for example, by a multi-stage paging function, a memory protection unit (MPU), and the like. The multi-stage paging function, for example, is a memory management unit (MMU) or the like.

As described above, according to the information processing apparatus 100 of the modified example of the third embodiment, the alterations of the programs realizing the functional blocks and data that is referred to by the functional blocks can be prevented. In this way, according to the information processing apparatus 100 of the modified example of the third embodiment, for example, an interruption of the execution of a real time task and the like can be blocked.

Finally, an example of the hardware configuration of the information processing apparatuses 100 according to the first to third embodiments will be described.

Example of the Hardware Configuration

Figure 14:
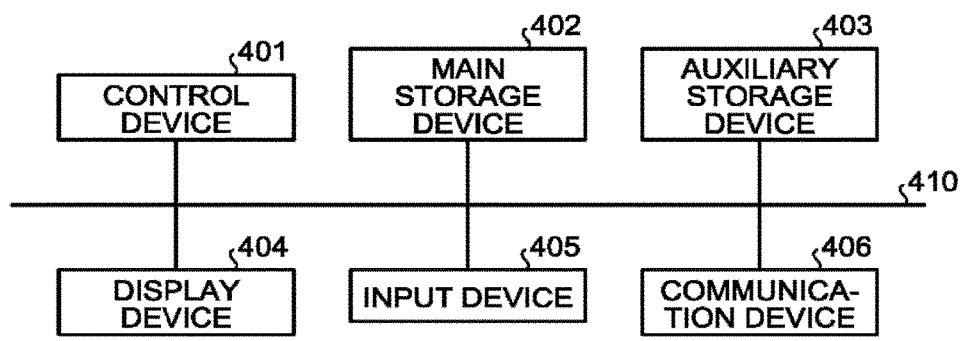
FIG. 14 is a diagram that illustrates an example of the hardware configuration of the information processing apparatuses according to the first to third embodiments.

FIG. 14 is a diagram that illustrates an example of the hardware configuration of the information processing apparatuses 100 according to the first to third embodiments. Each of the information processing apparatuses 100 according to the first to third embodiments includes: a control device 401; a main storage device 402; an auxiliary storage device 403; a display device 404; an input device 405; and a communication device 406. The control device 401, the main storage device 402, the auxiliary storage device 403, the display device 404, the input device 405, and the communication device 406 are interconnected through a bus 410.

The information processing apparatuses 100 according to the first to third embodiments, for example, are used for a built-in system of an in-vehicle information apparatus, an industrial control apparatus, and the like. In addition, the information processing apparatuses 100 according to the first to third embodiments may be personal computers, smart devices, or the like.

The control device 401 executes a program read from the auxiliary storage device 403 into the main storage device 402. The main storage device 402 is a memory such as a read only memory (ROM) or a random access memory (RAM). The auxiliary storage device 403 is a memory card, a hard disk drive (HDD), or the like.

The display device 404 displays information. The display device 404, for example, is a liquid crystal display. The input device 405 receives input of information. The input device 405, for example, is a keyboard, a mouse, or the like. In addition, the display device 404 and the input device 405 may be a liquid crystal touch panel having both a display function and an input function. In a case where any one of the information processing apparatuses 100 according to the first to third embodiments is used for a built-in system, the display device 404 and the input device 405 may be omitted.

The communication device 406 communicates with the other devices.

A program executed by any one of the information processing apparatuses 100 according to the first to third embodiments is stored on a computer-readable storage medium such as a CD-ROM, a memory card, a CD-R, or a digital versatile disk (DVD) in a file of an installable form or an executable form and is provided as a computer program product.

In addition, a program executed by any one of the information processing apparatuses 100 according to the first to third embodiments may be configured to be provided by being stored on a computer connected to a network such as the Internet and being downloaded through the network. Furthermore, a program executed by any one of the information processing apparatuses 100 according to the first to third embodiments may be configured to be provided through a network such as the Internet without downloading.

In addition, a program executed by any one of the information processing apparatuses 100 according to the first to third embodiments may be configured to be provided with being built in a ROM or the like in advance.

A program executed by any one of the information processing apparatuses 100 according to the first to third embodiments has a configuration of a module including functions that can be realized by the program among the functional configurations of one of the information processing apparatuses 100 according to the first to third embodiments.

The functions realized by each program are loaded into the main storage device 402 as the control device 401 reads the program from a storage medium such as the auxiliary storage device 403 and executes the read program. In other words, the functions realized by the program are generated on the main storage device 402.

In addition, a part of the functions of the information processing apparatuses 100 according to the first to third embodiments may be realized by hardware such as an integrated circuit (IC). For example, the switching unit may be realized either by a hardware function such as a CPU or an interrupt controller, or a software function operating on a CPU.

While certain embodiments have been described, these embodiments have been presented by way of example only, and are not intended to limit the scope the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a processor that includes a plurality of cores, the processor configured to function as:
      an inter-core interrupt generating unit that generates an interrupt in a designated core;
      a virtual machine monitor (VMM); and
      a plurality of operating systems (OSs),
      wherein the VMM is configured to function as:
         a reception unit that receives an interrupt;
         a first setting unit that assigns a task to a priority operating system (OS), each of the plurality of cores having the plurality of Oss including the priority OS; and
         a switching unit that switches a second OS, which is executing in a first core, to a first OS to which an interrupt for the first OS is input, when the reception unit receives an interrupt for the first core among the plurality of cores in which the first OS is the priority OS and the second OS is not the priority OS; and
      each of the plurality of the OSs is configured to function as:
         a second setting unit that assigns a real time task to a core among the plurality of cores, in which an OS executing the real time task is set as the priority OS, the real time task having a process priority level higher than that of a non-real time task;
         a selection unit that selects the real time task when an OS executed in the first core is the priority OS and the real time task is in an executable state, and selects the non-real time task when an OS executed in the first core is the priority OS, the non-real time task is in an executable state, and the real time task is not in the executable state;
         a processing unit that processes the real time task selected by the selection unit or the non-real time task selected by the selection unit; and
         a communication unit that, when an inter-OS communication request for requesting for communication between OSs is received from the real time task, inputs an inter-core interrupt request, in which a core with a communication destination OS being set as the priority OS is designated, to the inter-core interrupt generating unit and, when the inter-OS communication request is received from the non-real time task, inputs an inter-core interrupt request in which a core with the communication destination OS being not set as the priority OS is designated, to the inter-core interrupt generating unit.

2. The apparatus according to claim 1,
   wherein the reception unit inputs the interrupt to the first OS when the second OS is switched to the first OS or when the OS executed in the first core is the first OS at the time that the reception unit receives the interrupt, and keeps the interrupt on pending when the OS executed in the first core is the second OS differing from the first OS at the time that the reception unit receives the interrupt and the second OS is not switched to the first OS.

3. The apparatus according to claim 2,
wherein the switching unit switches the second OS to the first OS when a request for switching the second OS to the first OS is received by the reception unit from the second OS that is executing, and
the reception unit inputs the interrupt to the first OS when the interrupt input to the first OS is kept on pending.

4. The apparatus according to claim 1,
wherein the selection unit selects the non-real time task when the OS executed in the first core is not the priority OS and the non-real time task is present.

5. The apparatus according to claim 1,
wherein the reception unit receives a request for switching an OS executed in the first core when the OS executed in the first core is not the priority OS and the non-real time task is not present.

6. The apparatus according to claim 1, wherein
the processor is configured to further function as an interrupt setting unit that sets a notification destination of an interrupt, and
when the OS executed in the first core is switched to the priority OS, the interrupt setting unit performs setting such that the priority OS is notified of an interrupt input to the priority OS, and performs setting such that an interrupt input to a non-priority OS differing from the priority OS is kept pending.

7. The apparatus according to claim 6,
wherein, when the OS executed in the first core is switched to the non-priority OS, the interrupt setting unit performs setting such that an interrupt input to the non-priority OS as a switching destination OS is not kept pending and is input to the non-priority OS, and performs setting such that the interrupt input to the priority OS is input to the reception unit.

8. The apparatus according to claim 1, wherein the processor is configured to further function as a verification unit that verifies completeness of data of a verification target by calculating a first hash value of the data of the verification target of an alteration stored in the information processing apparatus and comparing the first hash value with a second hash value of the data of the verification target that is not altered.

9. The apparatus according to claim 1, wherein the processor is configured to further function as a protection unit that prohibits rewriting of data of a protection target stored in the information processing apparatus.

10. An information processing method of an information processing apparatus including a processor that includes a plurality of cores, the information processing method comprising:
generating an interrupt in a designated core among the plurality of cores,
wherein the processor is configured to function as:
a virtual machine monitor (VMM); and
a plurality of operating systems (OSs),
wherein the VMM is configured to perform the following functions:
receiving an interrupt;
assigning a priority operating system (OS) to each of the plurality of cores; and
switching a second OS which is executing in a first core, to a first OS to which an interrupt for the first OS is input, when an interrupt for the first core among the plurality of cores in which the first OS is the priority OS and the second OS is not the priority OS, is received; and wherein each of the plurality of the OSs is configured to perform the following functions:
assigning a real time task to a core among the plurality of cores, in which an OS executing the real time task is set as the priority OS, the real time task having a process priority level higher than that of a non-real time task;
selecting the real time task when an OS executed in the first core is the priority OS and the real time task is in an executable state, and selecting the non-real time task when an OS executed in the first core is the priority OS, the non-real time task is in an executable state, and the real time task is not in the executable state;
processing the real time task or the non-real time task; and
when an inter-OS communication request for requesting for communication between OSs is received from the real time task, inputting an inter-core interrupt request, in which a core with a communication destination OS being set as the priority OS is designated, to the inter-core interrupt generating unit and, when the inter-OS communication request is received from the non-real time task, inputting an inter-core interrupt request in which a core with the communication destination OS being not set as the priority OS is designated, to the inter-core interrupt generating unit.

11. A computer program product having a non-transitory computer-readable medium that stores therein a computer program causing an information processing apparatus including a processor that includes a plurality of cores to function as:
an inter-core interrupt generating unit that generates an interrupt in a designated core;
a virtual machine monitor (VMM); and
a plurality of operating systems (OSs),
wherein the VMM is configured to function as:
a reception unit that receives an interrupt;
a first setting unit that assigns a task to a priority operating system (OS), each of the plurality of cores having the plurality of OSs including the priority OS; and
a switching unit that switches a OS, which is executing in a first core, to a first OS to which an interrupt for the first OS is input, when the reception unit receives an interrupt for the first core among the plurality of cores in which the first OS is the priority OS and the second OS is not the priority OS; and
each of the plurality of the OSs is configured to function as:
a second setting unit that assigns a real time task to a core among the plurality of cores, in which an OS executing the real time task is set as the priority OS, the real time task having a process priority level higher than that of a non-real time task;
a selection unit that selects the real time task when an OS executed in the first core is the priority OS and the real time task is in an executable state, and selects the non-real time task when an OS executed in the first core is the priority OS, the non-real time task is in an executable state, and the real time task is not in the executable state;
a processing unit that processes the real time task selected by the selection unit or the non-real time task selected by the selection unit; and a communication unit that, when an inter-OS communication request for requesting for communication between OSs is received from the real time task, inputs an inter-core interrupt request, in which a core with a communication destination OS being set as the priority OS is designated, to the inter-core interrupt generating unit and, when the inter-OS communication request is received from the non-real time task, inputs an inter-core interrupt request in which a core with the communication destination OS being not set as the priority OS is designated, to the inter-core interrupt generating unit.

\* \* \* \* \*